V. BELL.
Barrel-Trucks.
No. 135,309.  Patented Jan. 28, 1873.
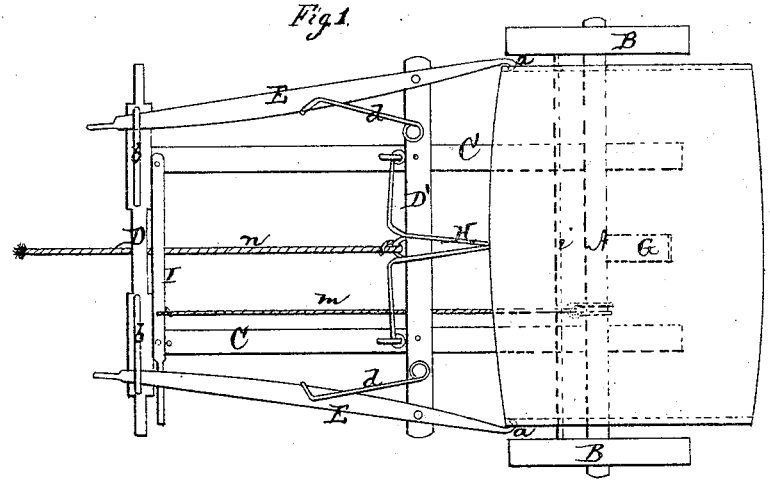
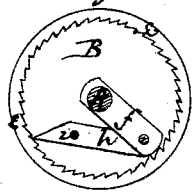
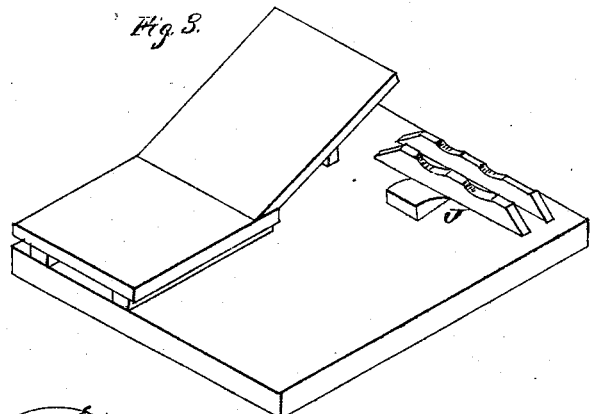
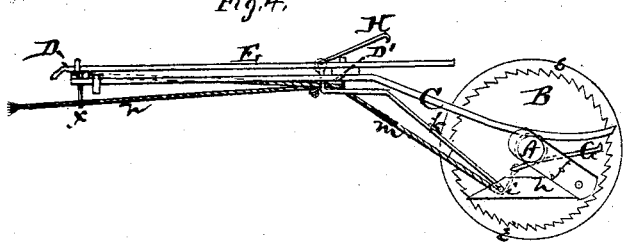
Witnesses:  Inventor.
Vernon Bell.
per Alexander Mason
Attorneys.

UNITED STATES PATENT OFFICE

VERNON BELL, OF MINNEAPOLIS, MINNESOTA.

IMPROVEMENT IN BARREL-TRUCKS.

Specification forming part of Letters Patent No. 135,369, dated January 28, 1873.

*To all whom it may concern:*

Be it known that I, VERNON BELL, of Minneapolis, in the county of Hennepin and in the State of Minnesota, have invented certain new and useful Improvements in Barrel-Truck; and do hereby declare that the following is a full, clear, and exact description thereof, reference being had to the accompanying drawing and to the letters of reference marked thereon making a part of this specification.

The nature of my invention consists in the construction and arrangement of a truck for moving barrels, as will be hereinafter more fully set forth.

In order to enable others skilled in the art to which my invention appertains to make and use the same, I will now proceed to describe its construction and operation, referring to the annexed drawing, in which—

Figure 1 is a plan view of the truck. Fig. 2 is an inside view of one of the wheels, and Fig. 4 is a side view of the truck with one wheel removed.

A represents the axle, having a wheel, B, at each end; and to the upper side of this axle are secured two curved bars, C C, forming a concavity in which the barrel is to rest. The outer ends of the bars C C are straight and connected by two cross-bars, D D', the ends of the outer cross-bar D forming handles, as shown in Fig. 1. Upon the ends of the cross-bar D' are pivoted levers E E, the inner ends of which are formed or provided with hooks $a\ a$ to grasp and hold the edge of the barrel. The outer ends of the levers pass under guide-bars or loops $b\ b$ on the bar D, and are forced outward by means of springs $d\ d$, so that the hooks $a\ a$ will be forced inward to hold the barrel. On the axle A, between the ends of the bars C C, is a stationary hook, G, and upon the straight portions of the bars C C is a swinging hook, H, between which the barrel is held in position. The inner side (or both sides) of each wheel B has a projecting flange, $e$, around the circumference, and this flange is toothed around the inside, as shown in Figs. 2 and 4. Upon each end of the axle A, within the wheel, is secured an arm, $f$, to the outer end of which is pivoted a pawl, $h$, to engage in the teeth on the flange $e$. The two pawls $h\ h$ are connected, near their outer ends, by a rod, $i$, upon which operates a spring, $k$, to keep the pawls engaged with the toothed flanges. A cord, $m$, attached to the axle passes under the rod $i$ and connects with a lever, I, which is pivoted to one of the bars C, and held by a pin passing through holes in the other. By moving this lever the cord $m$ will raise the rod $i$ and with it the pawls $h\ h$ out of the teeth. To the cross-bar D' is attached a rope, $n$, which passes through a guide-loop, $x$, on the under side of the bar D, and by this rope the truck can be raised or lowered on a steep incline.

In letting down or taking up out of a cellar, or moving up or down any other steep grade, the truck is manipulated by means of the rope $n$, and when this rope is drawn tightly the guide $f$, through which said rope passes, prevents the truck from tipping, and causes it to run in line with the rope.

By this truck a barrel may be easily and quickly grasped and raised and held in perfect and easy control while being carried. By the aid of the ratchet attachment the wheels may be alternately advanced up or down a steep incline. The barrel is carried high enough to be rolled into a store or warehouse where one step or platform is to be gained. A barrel can also be set down on end on a platform eight to ten inches higher than the floor.

A small movable platform placed before a barrel-rack enables one with this truck to put a barrel of oil or sirup in position in a row of barrels without disturbing a barrel on either side. The small block J in Fig. 3 is such a platform, placed the widest side down and thin edge next to the rack.

Having thus fully described my invention, what I claim as new, and desire to secure by Letters Patent, is—

1. In combination with a barrel-truck, the levers E E pivoted to the truck-frame, and having hooks $a\ a$ formed upon their outer ends, and operated by means of the springs $d\ d$, substantially as and for the purposes herein set forth.

2. The combination of the frame C D D', axle A, wheels B B, swinging or pivoted levers E E, with hooks $a\ a$, springs $d\ d$, stationary hooks G, and swinging hook H, all constructed and arranged to operate substantially as and for the purposes herein set forth.

3. In combination with the barrel-truck herein described, the arrangement of the rope $n$ and guide $f$, substantially as and for the purposes herein set forth.

4. The combination of the wheels B B with toothed flanges $e\ e$, axle A, arms $f\ f$, pawls $h\ h$, rod $i$, and spring $k$, all substantially as and for the purposes herein set forth.

5. In combination with the pawls $h\ h$ and rod $i$, the cord $m$ and lever I, substantially as and for the purposes herein set forth.

In testimony that I claim the foregoing I have hereunto set my hand this 11th day of June, 1872.

VERNON BELL.

Witnesses:
 BUDD REEVE,
 A. R. BROWN.